(12) United States Patent
Schneider-Die-Gross et al.

(10) Patent No.: US 11,783,473 B2
(45) Date of Patent: Oct. 10, 2023

(54) METHOD OF CHARACTERIZING A WOVEN FIBROUS STRUCTURE

(71) Applicants: SAFRAN AIRCRAFT ENGINES, Paris (FR); SAFRAN, Paris (FR); CENTRE NATIONAL DE LA RECHERCHE SCIENTIFIQUE, Paris (FR); ECOLE NORMALE SUPERIEURE PARIS—SACLAY, Gif-sur-Yvette (FR)

(72) Inventors: Julien Paul Schneider-Die-Gross, Moissy-Cramayel (FR); Intisar Belhaj Saad, Moissy-Cramayel (FR); Arturo Mendoza Quispe, Moissy-Cramayel (FR); Estelle Marie Laure Parra, Moissy-Cramayel (FR); Stéphane Roux, Rosny-sous-Bois (FR)

(73) Assignees: SAFRAN AIRCRAFT ENGINES, Paris (FR); SAFRAN, Paris (FR); CENTRE NATIONAL DE LA RECHERCHE SCIENTIFIQU, Paris (FR); ECOLE NORMALE SUPERIEURE PARIS-SACLAYE, Paris (FR)

( * ) Notice: Subject to any disclaimer, the term of this patent is extended or adjusted under 35 U.S.C. 154(b) by 0 days.

(21) Appl. No.: 18/006,177

(22) PCT Filed: Aug. 3, 2021

(86) PCT No.: PCT/FR2021/051437
§ 371 (c)(1),
(2) Date: Mar. 13, 2023

(87) PCT Pub. No.: WO2022/029385
PCT Pub. Date: Feb. 10, 2022

(65) Prior Publication Data
US 2023/0230227 A1 Jul. 20, 2023

(30) Foreign Application Priority Data

Aug. 5, 2020 (FR) ........................... 2008290

(51) Int. Cl.
*G06T 5/40* (2006.01)
*G06T 7/00* (2017.01)
*G06T 5/20* (2006.01)

(52) U.S. Cl.
CPC .............. *G06T 7/001* (2013.01); *G06T 5/20* (2013.01); *G06T 2200/04* (2013.01); *G06T 2207/10081* (2013.01); *G06T 2207/30124* (2013.01)

(58) Field of Classification Search
CPC .............. G02B 26/101; G02B 27/017; G02B 26/0833; G02B 17/0864; G02B 26/085;
(Continued)

(56) References Cited

U.S. PATENT DOCUMENTS 11,049,291 B1 * 6/2021 Montazeri ............. G06T 11/001
2017/0243373 A1 * 8/2017 Bevensee ............... G03B 35/10

FOREIGN PATENT DOCUMENTS

EP 3084405 A1 10/2016
FR 3042869 A1 4/2017
(Continued)

OTHER PUBLICATIONS

Hrishikesh Bale et al. "Characterizing Three-Dimensional Textile Ceramic Composites Using Synchrotron X-Ray Micro-Computed-Tomography" Journal of the American Ceramic Society, US. vol. 95. No. 1. Jan. 31, 2012 (Jan. 31, 2012). pp. 392-402 DOI: 10.II II/j.1551-2916.2011.04802.x ISSN: 0002-7820. XP055331937.
(Continued)

*Primary Examiner* — Quan M Hua
(74) *Attorney, Agent, or Firm* — Bookoff McAndrews, PLLC

(57) ABSTRACT

The invention relates to a method for characterizing, from a volume image, a fibrous structure having a three-dimensional weaving between a plurality of warp yarns extending along a first direction and a plurality of weft yarns extending along a second direction perpendicular to the first one, the method comprising: a first processing of the volume image by filtering along a third direction perpendicular to the first and second directions so as to attenuate the periodic patterns along the third direction, obtaining a two-dimensional image corresponding to an intermediate plane along the third direction of the filtered volume image, a second processing of the two-dimensional image by filtering along the first or second direction so as to attenuate the periodic patterns, obtaining a one-dimensional profile representing the positions of warp or weft columns and corresponding to an intermediate line along the first or second direction.

20 Claims, 9 Drawing Sheets

(58) Field of Classification Search
CPC ............ G02B 27/0103; G02B 26/0841; G02B 2027/0105; G06V 10/56; G06V 20/00; G06V 10/40; G06V 10/44; G06V 10/443; G06V 10/467; G06V 20/69; G06V 2201/122; G06V 30/10; G06V 30/262; G06V 40/13; G06F 18/214; G06F 18/10; G06F 18/2411; G06F 18/2415; G06F 18/253; G06F 3/01; G06F 3/011; G06F 3/013; G06F 3/0304; G06T 2207/10081; G06T 2207/30164; G06T 7/001; G06T 1/00; G06T 2207/30124; G06T 5/007; G06T 5/006

See application file for complete search history.

(56) References Cited

FOREIGN PATENT DOCUMENTS

| | | | |
|---|---|---|---|
| FR | 3050274 A1 | 10/2017 | |
| WO | 2006136755 A2 | 12/2006 | |
| WO | 2015033044 A1 | 3/2015 | |
| WO | 2015092212 A1 | 6/2015 | |
| WO | WO-2020092509 A1 * | 5/2020 | ........... G06N 3/0454 |

OTHER PUBLICATIONS

International Search Report issued in Interantional Application No. PCT/FR2021/051437, dated Dec. 8, 2021 (5 pages).

English Translation of Written Opinion issued in International Application No. PCT/FR2021/051437, dated Dec. 8, 2021 (3 pages).

French Search Report issued in French Application No. FR2008290 dated Mar. 23, 2021 (2 pages).

* cited by examiner

[Fig. 1]
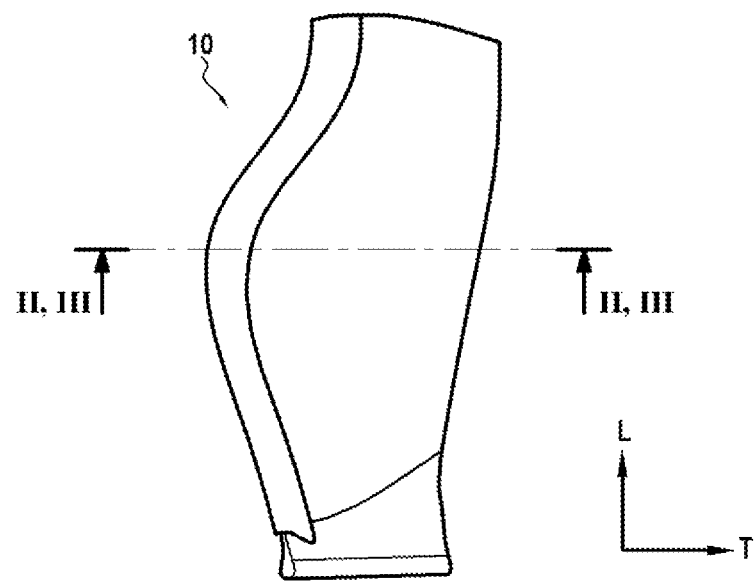
[Fig. 2]
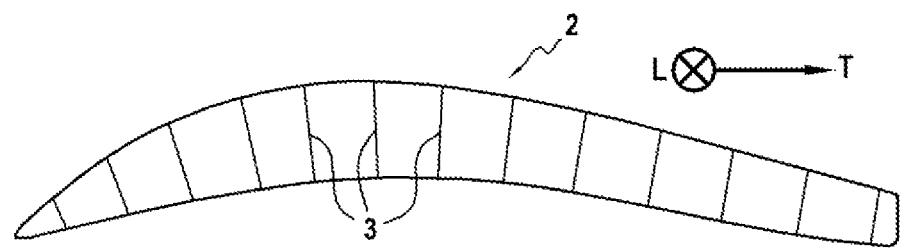
[Fig. 3]
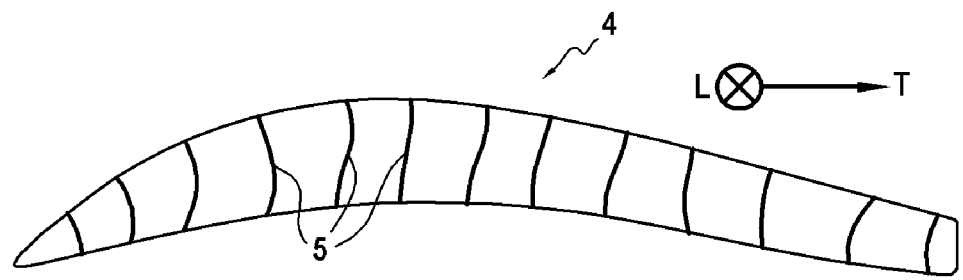

[Fig. 4]
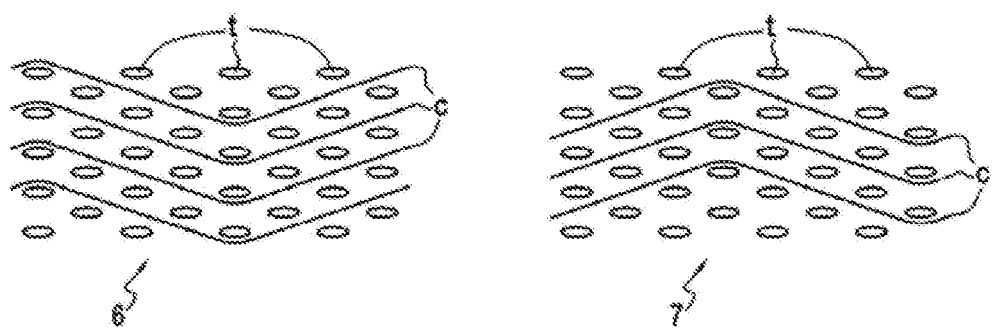
[Fig. 5]
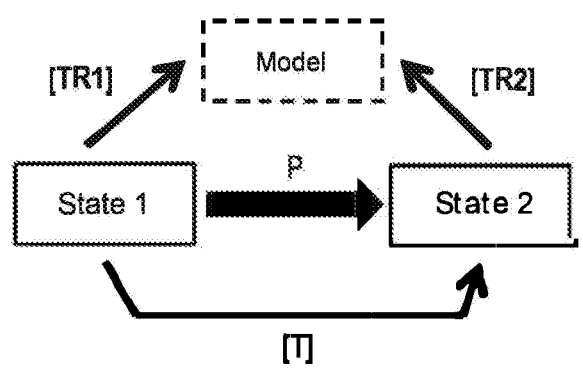

[Fig. 6]
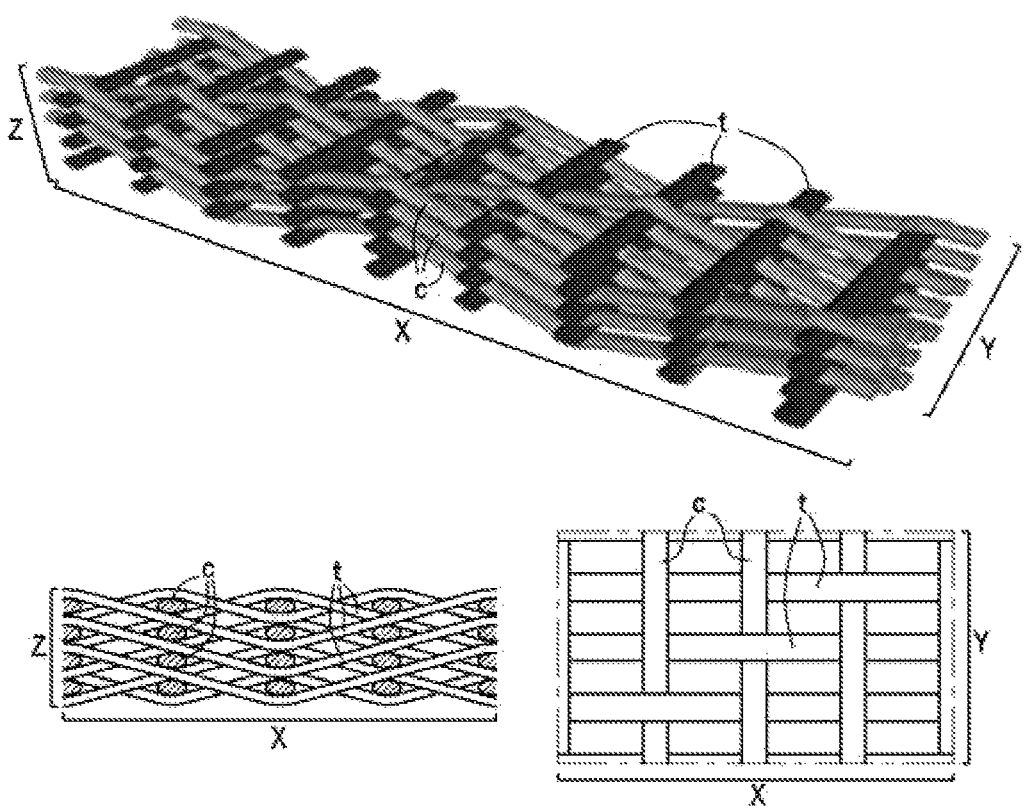

[Fig. 7]
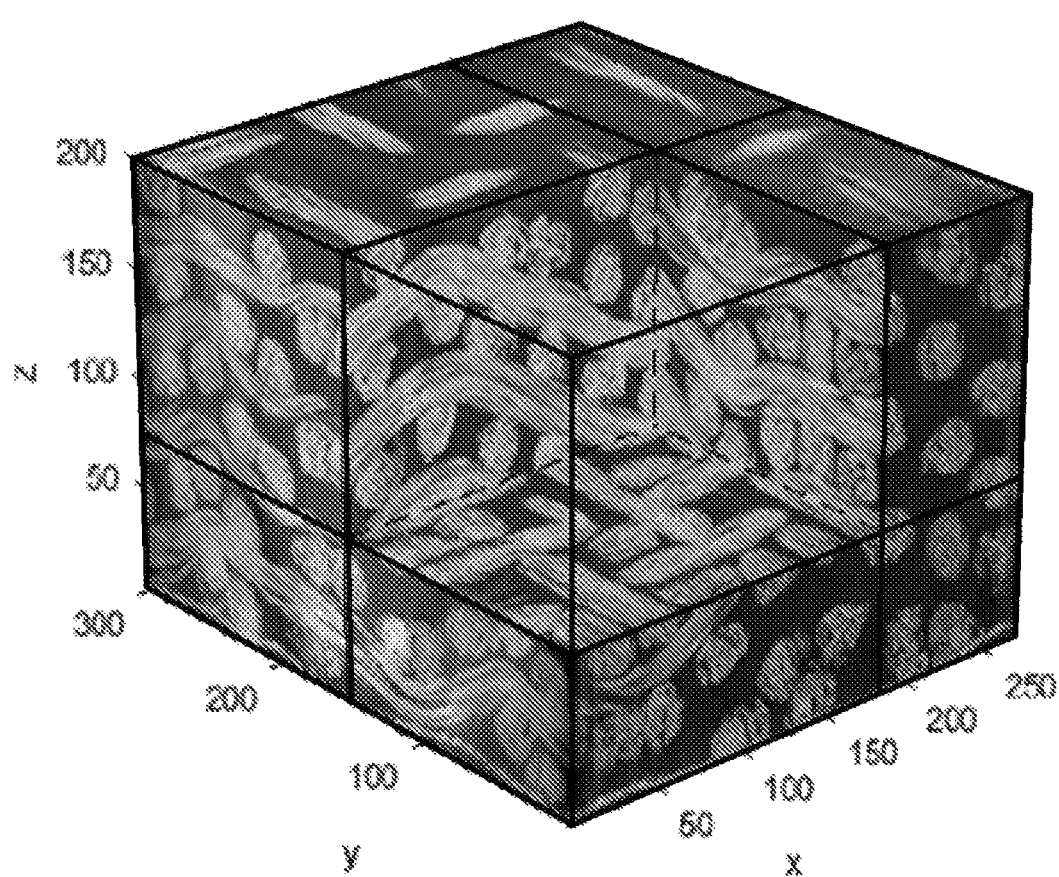

[Fig. 8]
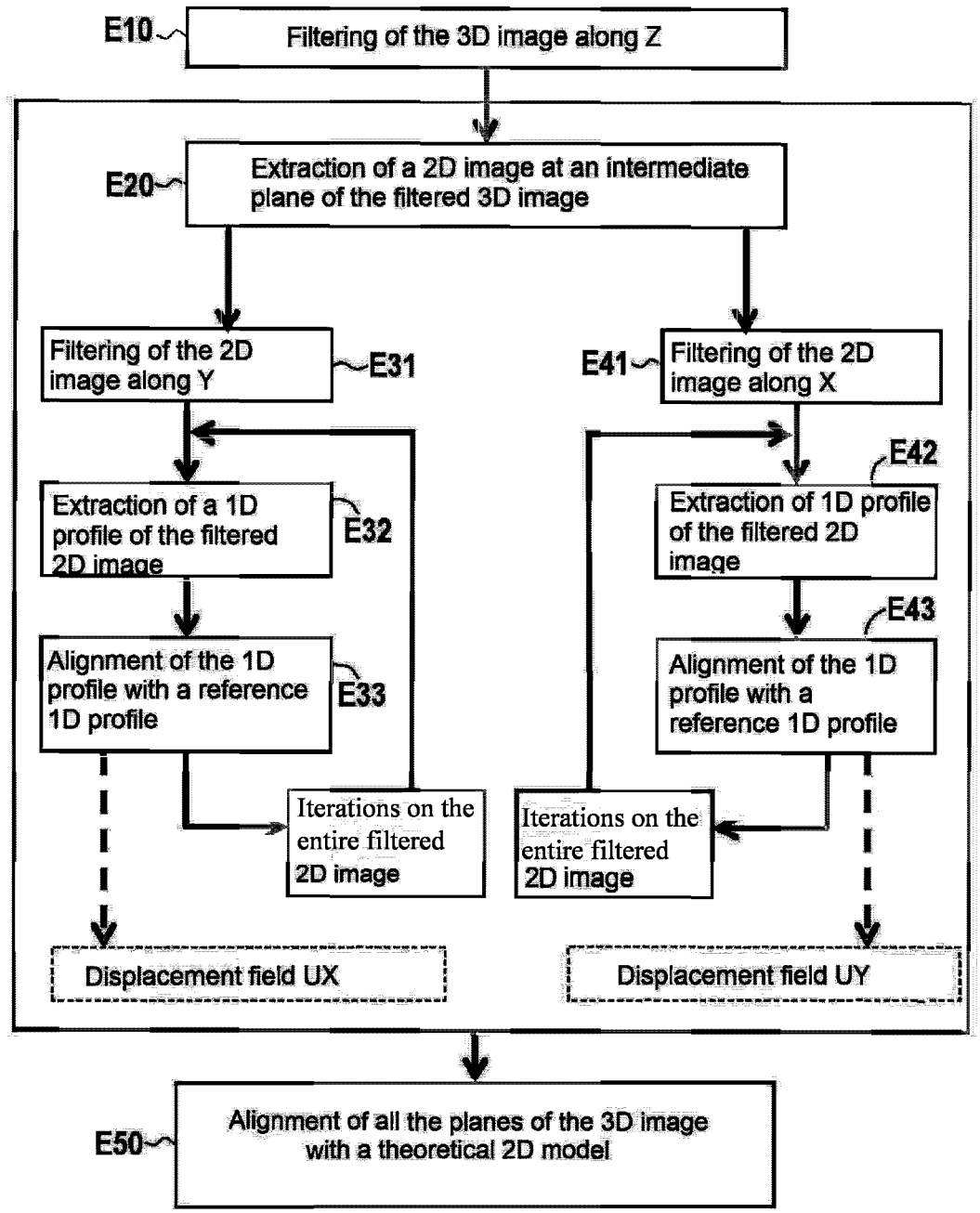

[Fig. 9]
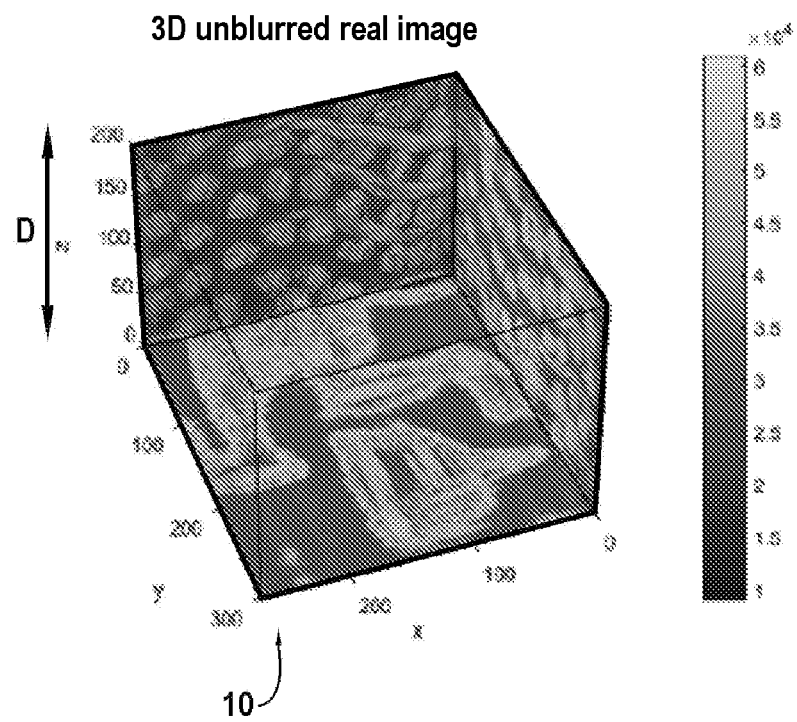
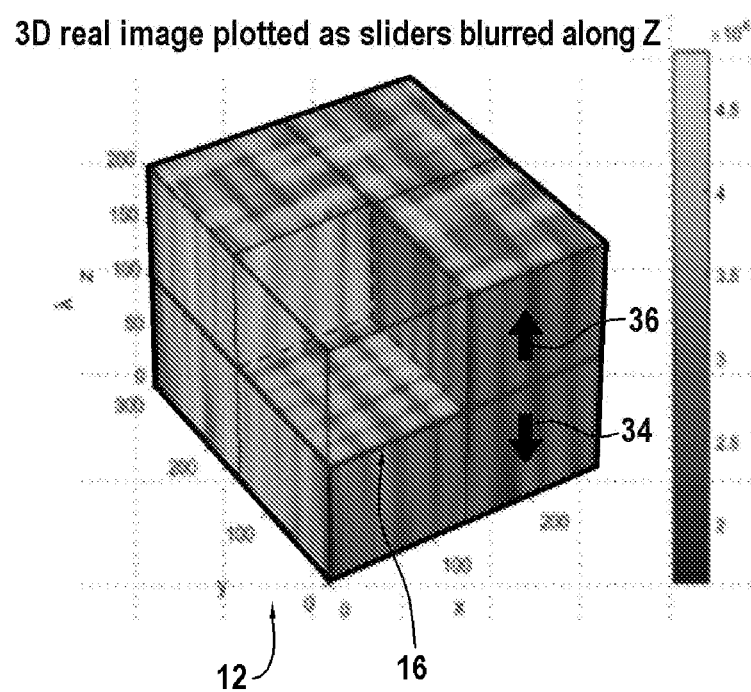

[Fig. 10]
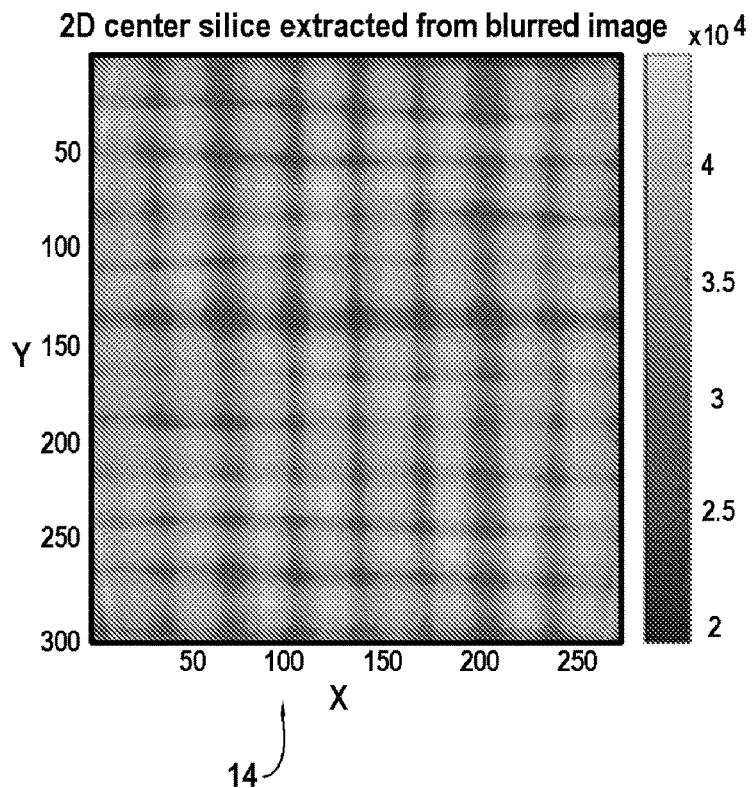
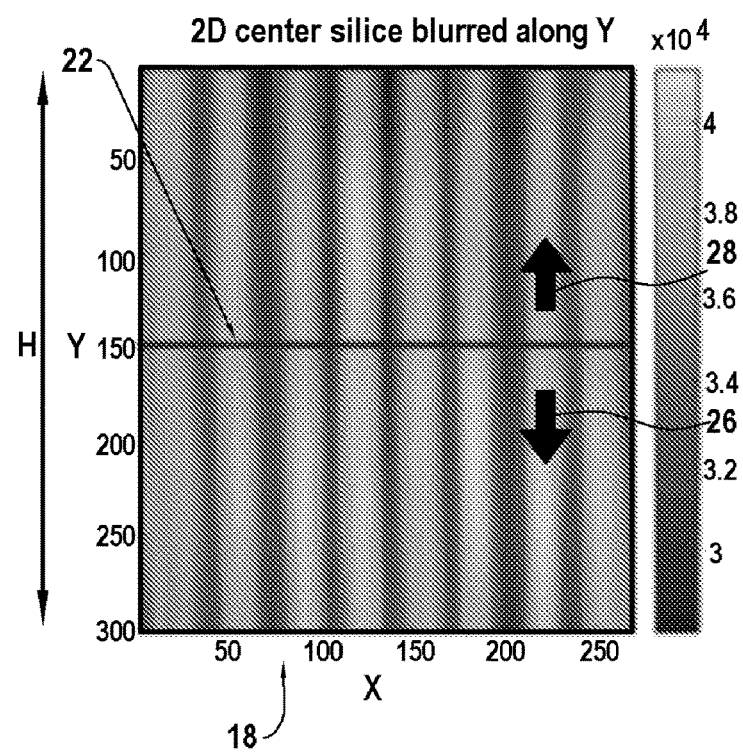

[Fig. 11]
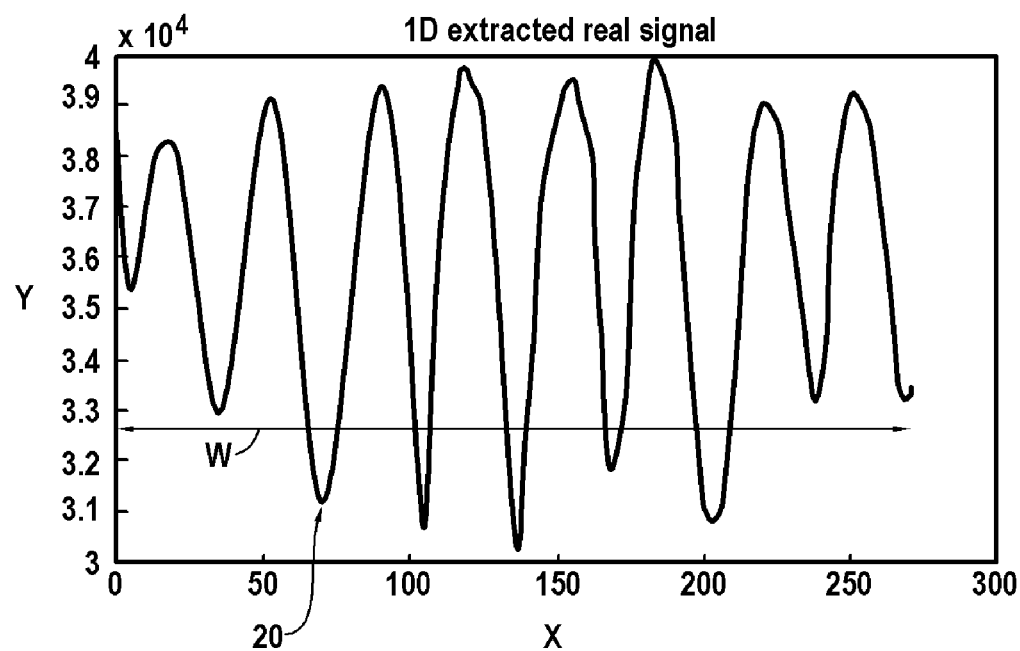
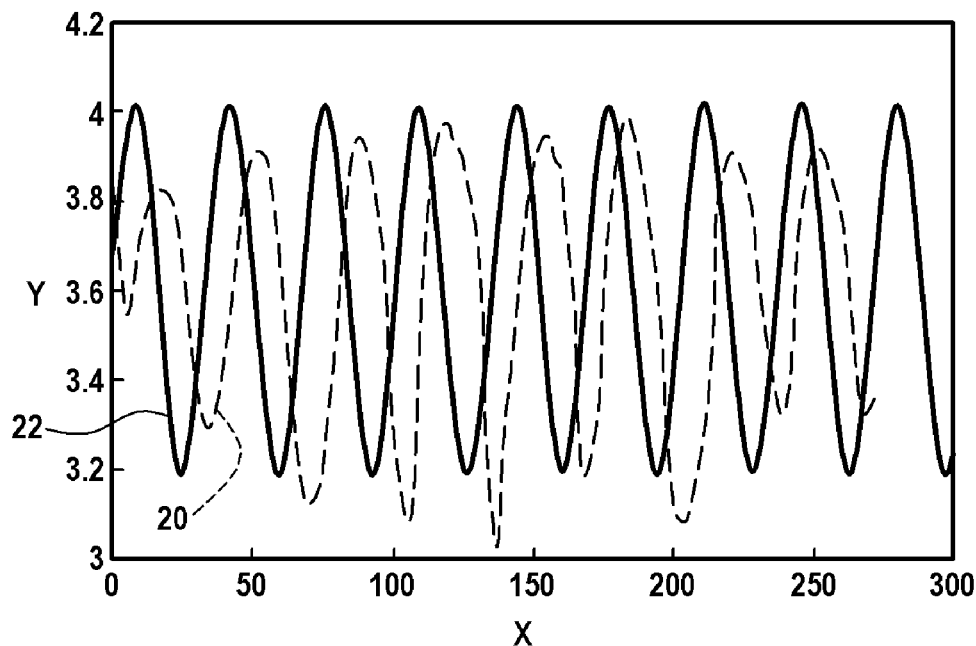

[Fig. 12]
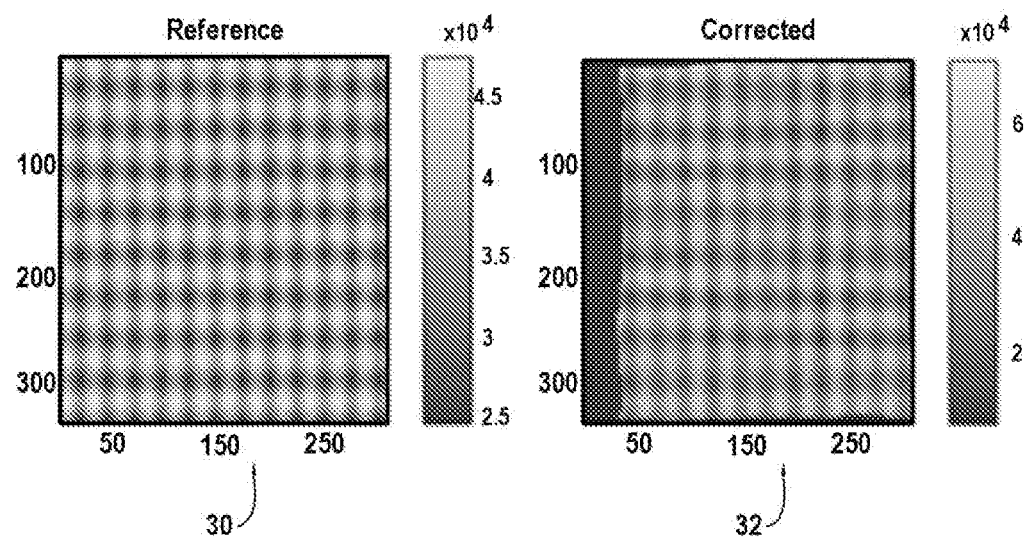
[Fig. 13]
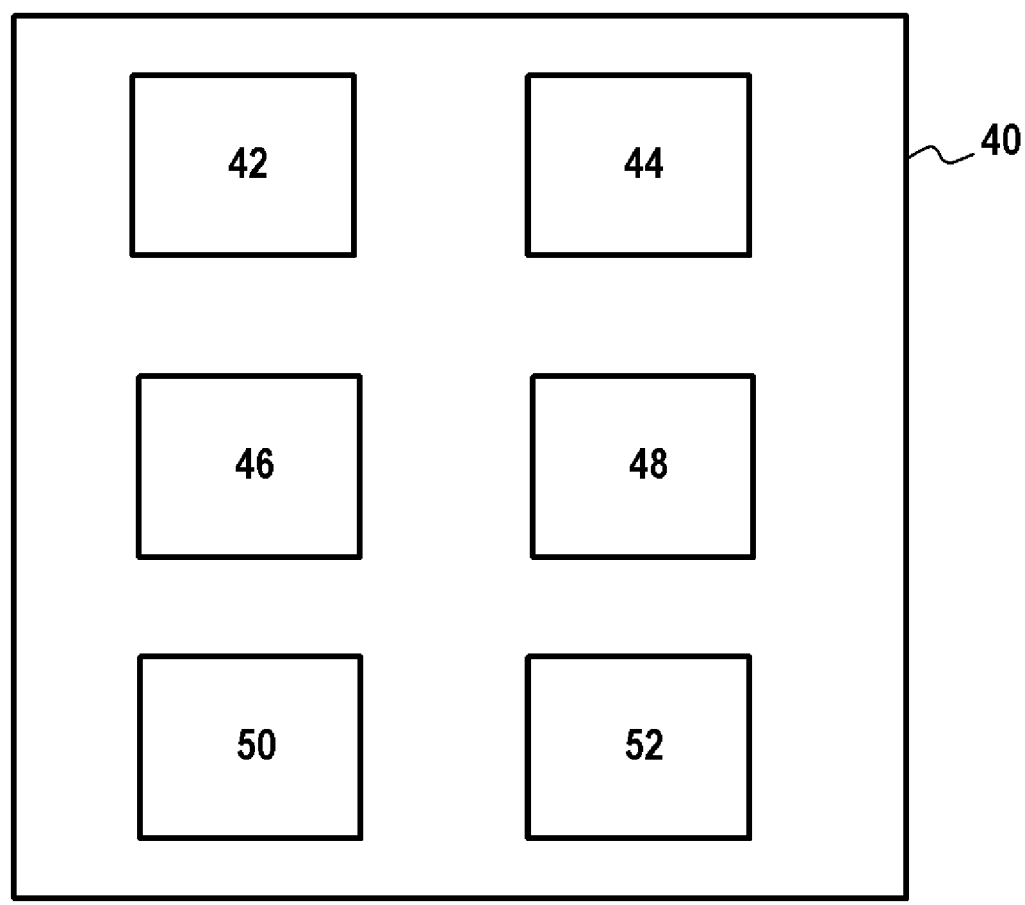

METHOD OF CHARACTERIZING A WOVEN FIBROUS STRUCTURE

CROSS-REFERENCE TO RELATED APPLICATION(S)

This patent application is a U.S. National Stage entry of International Application No. PCT/FR2021/051437, filed on Aug. 3, 2021, now published as WO 2022/029385 A1, which claims benefit to French Application No. 2008290, filed on Aug. 5, 2020.

TECHNICAL FIELD

The invention falls within the field of the design, characterization and monitoring of parts for industry, in particular the parts that are to undergo significant mechanical stresses, such as aircraft engine parts, for example. The invention more particularly relates to the characterization of woven fibrous structures or of the parts made of composite material comprising a fibrous structure as a fibrous reinforcement densified by a matrix.

PRIOR ART

Most woven fibrous reinforcements intended to be used to manufacture a part made of composite material are first provided in a planar shape at the outlet of the loom. The blank obtained must be shaped to subsequently match the shape of the mold in which its densification, for example by injection and polymerization of a resin, will be made. The shaping of the blank and the injection of the shaped blank (or preform) can cause substantial modifications to the disposition of the yarns or strands within the preform. These modifications can for example include shifts corresponding to a modification of the initial 90° angle between the warp yarns and the weft yarns, or slips of warp or weft columns relative to each other. These modifications of the reinforcement can have an impact on the mechanical strength of the part and its behavior under stress, which justifies the need to characterize them with accuracy in order to be able to optimize the manufacturing method.

The X-ray tomography (CT for Computed Tomography) technique is known. This experimental means utilizes the differential absorption of the X-rays by different materials to reconstruct, by the calculation, from a series of radiographies, a three-dimensional image of the part studied. The information contained in the tomography images is valuable because it concerns the entire volume of the part and gives access not only to its microstructure but also potentially to its defects.

When it is sought to study the displacements of yarns or strands in a fibrous blank obtained by three-dimensional weaving, in a fibrous preform obtained by shaping of such a blank, or in a composite material part comprising such a preform as a fibrous reinforcement, problems illustrated using the example below may arise.

FIG. 1 shows an aeronautical turbomachine blade 1 comprising a fibrous reinforcement densified by a matrix. Such a blade 1 can have a double camber over its length along the longitudinal direction L, also called "twist". To obtain such a shape, the initially planar blank must be shaped in appropriate tools or directly in the injection mold.

FIG. 2 is a simplified cross-sectional view of a blade fibrous preform 2 obtained by three-dimensional weaving of longitudinal yarns (extending along the longitudinal direction L) or warp yarns, with transverse yarns (extending along a transverse direction T) or weft yarns, which has been shaped to obtain a characteristic camber of the blade 1. The expected simplified orientation of a few columns of warp yarns following the shaping step is identified by lines 3.

FIG. 3 is a sectional view taken from an X-ray tomography of a fibrous preform 4 resulting from the shaping of a fibrous blank obtained by three-dimensional weaving. In this figure, columns of warp yarns have been identified by lines 5 whose deformation has been observed in FIG. 2. This deformation (geometric transformation) is induced by the manufacturing process and appears as initial warp and weft planes which become curved surfaces.

FIG. 4 shows two examples of successive simplified weaving planes 6 and 7 of a fibrous structure woven with an interlock weave. Warp yarns have been identified by c and weft yarns have been identified by t. It is seen that the weaving patterns are very close and are generally differentiated by simple phase-shifts between two neighboring planes. The weaving patterns are indeed periodic or close to the periodicity within the woven structure.

Because of such deformations and of the minimal differences between two successive weaving planes, it is difficult or even impossible in this situation to visualize a weaving plane which extends perpendicularly to the plane of FIG. 3 to control the quality of the weaving and deduce any defects related to displacements of yarns or strands. It would therefore be desirable to be able to identify the transformations that took place during the shaping in order to be able to straighten the obtained image. In this context, the term "straighten" corresponds to a re-transformation of the geometry of the weaving in its simplified state.

In the present case, the identification of these displacements is carried out manually via the analysis of tomographic images.

There is therefore a need for a characterization method that is more robust in the context of the study of fibrous structures obtained by three-dimensional weaving.

DISCLOSURE OF THE INVENTION

To this end, the invention proposes a method for characterizing, from a volume image, a fibrous structure having a three-dimensional weaving according to a given pattern between a plurality of warp yarns or strands extending along a first direction and a plurality of weft yarns or strands extending along a second direction perpendicular to the first one, the method comprising:

a first processing of the volume image by filtering along a third direction perpendicular to the first and second directions so as to attenuate the periodic patterns along the third direction, obtaining a two-dimensional image representing warp yarns or strands and weft yarns or strands, said image corresponding to an intermediate plane along the third direction of the filtered volume image, a second processing of the two-dimensional image by filtering along the first or second direction so as to attenuate the periodic patterns along the first or second direction, obtaining a one-dimensional profile representing the positions of columns of warp or weft yarns or strands, said profile corresponding to an intermediate line along the first or second direction of the filtered two-dimensional image, and comparing the one-dimensional profile with a reference profile.

By "three-dimensional weaving", "3D weaving", "multi-layer weaving" is meant here a weaving mode by which some at least of the warp yarns (or longitudinal yarns) bind weft yarns (or transverse yarns) on several weft layers. Such a weaving can be carried out in a loom of the jacquard type, in a manner known per se. In one exemplary embodiment, the given weaving pattern can be of the interlock type. By "interlock" is meant a three-dimensional weave whose each layer of warp yarns binds several layers of weft yarns with all the yarns of the same warp column having the same movement in the weave plane. The document WO2006/136755 describes the production of such weaves.

By "intermediate" plane or line is meant a plane or a line that is not located on an edge of the volume image or two-dimensional image considered.

The inventors have developed a characterization method which, instead of relying on the direct comparison between two states of the same woven fibrous structure to deduce the transformation linking these two states, assumes that it is possible to separate the transformation linking the two states of the structure into two secondary transformations which link each state to a model of the structure, for example an undeformed model of the structure. The combination of the secondary transformations allows finding the transformation linking the two considered states. The simplified model is reflected in the method according to the invention in the form of the reference profile with which the one-dimensional profile obtained from the initial volume image is compared.

The method according to the invention is further remarkable in that it is suitable for the characterization of woven fibrous structures having a given periodic pattern. Using each of the image processing operations, the resolution of the characterization problem is simplified, first by obtaining a filtered three-dimensional image, then a filtered two-dimensional image, then by extracting at least a one-dimensional profile from the two-dimensional image which is representative of the position of the yarn or strand columns along a direction of the weaving at a considered position of the volume. The filtering allows overcoming the difficulties related to the repetition of the weaving patterns along the different directions. It is then possible, by comparison with a reference one-dimensional profile, for example constructed from a simplified weaving model, to obtain information on the displacement of the yarn or strand columns at the level of a given line relative to this simplified weaving model. The comparison is thus greatly simplified since it is made at a lower dimension than with the volume image directly. Furthermore, the digital image correlation (DIC) algorithms (Sutton, M. A., Orteu, J. J., & Schreier, H. (2009). "Image correlation for shape, motion and deformation measurements: basic concepts, theory and applications. Springer Science & Business Media") that can be used for the comparison converge more easily through the filtering.

It is then possible to perform an iteration on all the lines of the same intermediate plane and in the two weaving directions, then on several consecutive planes of the volume image by taking into account the results obtained at a single dimension for the intermediate plane, to obtain information on the displacements occurring in the volume of the image compared to a simplified weaving model. By obtaining information on the transformations between the real volume image and a simplified weaving model, it is possible to more easily characterize the displacements involved in the different steps of treatment of a woven fibrous structure to manufacture a composite material part.

In one exemplary embodiment, the method can further comprise the determination of a displacement field from the result of the comparison. In other words, a result of the comparison step can be a displacement field. This displacement field can be obtained using a DIC algorithm.

The study of the displacement fields between different steps of a method for manufacturing the composite material part allows understanding the influence of the parameters of the loom (weaving step), the blank shaping kinematics to allow numerically providing for the passage from one configuration to another (shaping step), or evaluating the three-dimensional residual stresses at the end of manufacture (resin injection step).

In one exemplary embodiment, a comparison step can correspond to a step of aligning the one-dimensional profile with the reference profile. Particularly, this step can be performed using a DIC algorithm adapted to the one-dimensional case.

In one exemplary embodiment, the filtering of the first and/or second processing can be a Gaussian filtering where the width of the filter is determined as a function of an average spacing between yarn or strand layers along the considered filtering direction. Particularly, the width of the Gaussian filtering can be comprised between T and a few T where T is the average spacing between yarn or strand layers along the considered filtering direction and in the considered sample.

In one exemplary embodiment, the method can further comprise a step of obtaining several one-dimensional profiles at consecutive lines of the filtered two-dimensional image, and a step of comparing iteratively from the intermediate line each obtained one-dimensional profile with the reference profile by taking into account the result of the comparison made at a previous line. Particularly, the comparison step can be performed iteratively by starting with the intermediate line and up to the edges of the filtered two-dimensional image, by carrying out two passages: one towards each opposite edge of the image. All the results obtained for the same plane are thus consistent and do not present any discontinuities. The results obtained for the intermediate plane can then be used to initiate comparisons between the two-dimensional images of successive planes of the volume image and a simplified two-dimensional model.

In one exemplary embodiment, the method can further comprise, after having compared all the one-dimensional profiles in the first and second directions with the reference profile, a step of obtaining several two-dimensional images at consecutive planes of the filtered volume image, and a step of comparing iteratively from the intermediate plane each obtained two-dimensional image with a reference two-dimensional image by taking into account the result of the comparison made at a previous plane. Particularly, the comparison step can be performed iteratively by starting with the intermediate plane and up to the edges of the filtered volume image, by performing two passages: one towards each opposite edge of the image. It is thus possible to achieve an alignment of the entire volume image by ensuring the convergence of the DIC algorithms, which are initialized with the results obtained at a previous iteration, and by starting with the results obtained for the intermediate one-dimensional plane.

In one exemplary embodiment, the volume image can be obtained by X-ray tomography.

The invention also relates to a system for characterizing, from a volume image, a fibrous structure having a three-dimensional weaving according to a given pattern between a plurality of warp yarns or strands extending along a first direction and a plurality of weft yarns or strands extending along a second direction perpendicular to the first one, the system comprising:

a first module for processing the volume image by filtering along a third direction perpendicular to the first and second directions so as to attenuate the periodic patterns along the third direction, a module for obtaining a two-dimensional image representing warp yarns or strands and weft yarns or strands, said image corresponding to an intermediate plane along the third direction of the filtered volume image, a second module for processing the two-dimensional image by filtering along the first or second direction so as to attenuate the periodic patterns along the first or second direction, a module for obtaining a one-dimensional profile representing the positions of columns of weft or warp yarns or strands, said profile corresponding to an intermediate line along the first or second direction of the filtered two-dimensional image, and a module for comparing the one-dimensional profile with a reference profile.

The invention also proposes a computer program including instructions for the execution of the steps of a method as defined above when said program is executed by a computer.

It should be noted that the computer programs mentioned in the present disclosure can use any programming language, and be in the form of source code, object code or intermediate code between source code and object code, such as only in a partially compiled form or in any other desirable form.

The invention also proposes a computer-readable recording medium on which a computer program is recorded comprising instructions for the execution of the steps of a method as defined above.

The recording (or information) media mentioned in the present disclosure can be any entity or device capable of storing the program. For example, the medium can include a storage means, such as a ROM, for example a CD ROM or a microelectronic circuit ROM, or a magnetic recording means, for example a floppy disk or a hard disk.

On the other hand, the recording media can correspond to a transmissible medium such as an electrical or optical signal, which can be conveyed via an electrical or optical cable, by radio or by other means. The program according to the invention can be particularly downloaded from an Internet-type network.

Alternatively, the recording media can correspond to an integrated circuit in which the program is incorporated, the circuit being adapted to execute or to be used in the execution of the method in question.

The invention also relates to a method for manufacturing a part made of composite material comprising a fibrous reinforcement densified by a matrix, the method comprising the manufacture of the composite material part from a fibrous structure obtained by three-dimensional weaving, and the characterization of the part by a characterization method such as the one presented above. The manufacture of the composite material part can comprise a step of weaving the fibrous structure, a step of shaping the fibrous structure, and a step of injecting a matrix (for example a resin) into the porosity of the shaped fibrous structure.

In one exemplary embodiment, a method for weaving a fibrous structure can comprise the weaving the fibrous structure by three-dimensional weaving, and the characterization of the fibrous structure by a characterization method as the one presented above.

In one exemplary embodiment, a method for shaping a fibrous structure obtained by three-dimensional weaving can comprise the shaping of the fibrous structure and the characterization of the fibrous structure thus woven by a characterization method such as the one presented above.

In one exemplary embodiment, a method for densifying a fibrous structure obtained by three-dimensional weaving can comprise the injection of a resin into the porosity of the fibrous structure to form a part made of composite material and the characterization of the part thus formed by a characterization method such as the one presented above.

BRIEF DESCRIPTION OF THE DRAWINGS

FIG. 1 is a schematic view of an aeronautical turbomachine fan blade.

FIG. 2 is a simplified sectional view of a woven fibrous structure to manufacture a blade such as that of FIG. 1 showing the simplified alignment of several columns of warp yarns.

FIG. 3 is a cross-sectional view taken from an X-ray tomography of a woven fibrous structure to manufacture a blade such as that of FIG. 1 showing the misalignment (the inclination, curvature, inflection or more complex shape) of several columns of warp yarns.

FIG. 4 shows two simplified weaving planes in a woven fibrous structure with interlock weave.

FIG. 5 illustrates the breakdown of the transformation linking two deformed states of a structure by involving a model of the structure.

FIG. 6 illustrates a simplified weaving model for an interlock weave.

FIG. 7 is a volume image obtained by X-ray tomography of a part comprising an woven fibrous structure with interlock weave. In this visualization, the X, Y, Z scales are not equal.

FIG. 8 is a flowchart showing the main steps of a characterization method according to one embodiment of the invention.

FIG. 9 shows the volume image used to illustrate the method and the result obtained following the first image processing. In this visualization the X, Y, Z scales are not equal.

FIG. 10 shows the extracted two-dimensional image and the result obtained following the second image processing. In this visualization, the X, Y scales are not equal.

FIG. 11 shows the extracted one-dimensional profile and the comparison between said profile and a reference profile.

FIG. 12 shows the reference two-dimensional image used to align the two-dimensional images and the aligned or corrected two-dimensional image of the intermediate plane. In this visualization, the X, Y scales are not equal.

FIG. 13 shows a characterization system according to one embodiment of the invention.

DESCRIPTION OF THE EMBODIMENTS

The method according to the invention relates to the fibrous structures woven by three-dimensional weaving, but also the parts made of composite material that integrate such woven fibrous structures as an fibrous reinforcement.

FIG. 5 illustrates a principle underlying the invention according to which to characterize the fibrous structure, the transformation linking two states of the structure (defined in terms of deformations) is broken down into several secondary transformations linking each state to a simplified or reference model of the structure. Each of these secondary transformations are determined by a digital image correlation (DIC) algorithm.

A fibrous structure in a State 1 of deformations which then undergoes a transformation [T] during a method P is considered. The method P can be for example a step of weaving the fibrous structure, shaping or densifying a matrix by injection. It is possible to break down the transformation [T] by using a state of the structure corresponding to a simplified model of the structure. A transformation [TR1] is then defined which links the State 1 of the structure to the Model, and a transformation [TR2] which links the State 2 of the structure to the Model. Then, the transformation [T] can be seen as the combination of the transformations [TR1] and [TR2]$^{-1}$. By accessing the transformations [TR1] and [TR2], the transformation [T] linking two states of the fibrous structure can be obtained. This breakdown further allows straightening the volume image of the structure in a given state in order to be able to study its deformations for quality control purpose.

In the present text, the term "yarns" is used interchangeably to designate yarns or strands.

FIG. 6 illustrates several views of a simplified model of a woven fibrous structure obtained by three-dimensional weaving with an interlock-type weave. The weft direction corresponds to the X axis, the warp direction corresponds to the Y axis, and the thickness direction of the structure corresponds to the Z axis. The X, Y and Z axes are perpendicular. The weft yarns t generally extend along the weft direction given by the X axis, and the warp yarns c generally extend along the warp direction given by the Y axis. FIG. 6 also shows a side view of the fibrous structure in an XZ plane where the weft yarns t undulate, and a top view in an XY plane where the warp c and weft t yarns form a grid pattern, intersecting at 90°.

FIG. 7 shows an example of a volume image obtained by X-ray tomography of a woven fibrous structure within a part made of composite material. The Model in FIG. 6 with an interlock weave was used to weave the fibrous structure of this example. The X, Y, and Z axes are equivalent to those defined for the Model of the Fiber Structure. The yarns are identified in light gray, and the matrix is identified in dark gray.

An example of a method for characterizing a woven fibrous structure will now be described in relation to the flowchart in FIG. 8.

A first step E10 consists in applying a first filtering processing to a volume image 10 (FIG. 9) extracted from the image of FIG. 7. This first processing consists in applying a Gaussian filter (by convolution) to the volume image 10 along the Z direction, that is to say in the thickness of the sample, so as to minimize the effect of the modulations of the warp and weft yarns in the Z direction. The radius of the Gaussian filter is advantageously defined in an interval comprised between T and a few T where T is the average of the spacings between the yarn layers along the Z direction. This average can be idealized, for example the one defined in the loom making it possible to obtain the woven fibrous structure, or be calculated from the sample considered. The filtered volume image 12 is thus obtained (FIG. 9).

Then, a two-dimensional image 14 is obtained (step E20, FIG. 10) by extraction at the level of an intermediate plane 16 or intermediate layer of the filtered volume image 12. The image 16 represents warp yarns (along the X direction) and the weft yarns (along the Y direction) which intersect, and gathers information regarding the neighboring planes using the filtering. The intermediate plane 16 is preferably chosen at an intermediate position, for example at z0=D/2 where D is the depth of the volume image 10 along the Z axis. The choice of an intermediate plane 16 allows having a layer of the fibrous structure where the deformations are generally weaker than at the edges, which makes the initialization of the DIC algorithms more robust.

Next, in step E31, a second processing of the two-dimensional image 14 is carried out by filtering in the Y direction. A Gaussian filter having properties similar to the one used previously is applied, except that it is applied in the Y direction and takes into account to define the width of the filter the average spacing between the planes of warp yarns. This filtering operation allows attenuating the high frequencies due to the intersections of the yarns. The filtered two-dimensional image 18 is thus obtained (FIG. 10).

Then, in step E32, a one-dimensional profile 20 (FIG. 11) representing the positions of the columns of weft yarns is obtained, which corresponds to an extraction at an intermediate line 22 along the Y direction of the filtered two-dimensional image 18. The intermediate line 22 is preferably chosen at an intermediate position, for example at y0=H/2 where H is the height of the image.

Next, in step E33, the one-dimensional profile 20 obtained in the previous step is compared with a reference profile 24. The reference profile 24 is here obtained from the simplified weaving model which was presented previously. The equation of the model used as reference profile 24 is given below, where μ and σ are the average and the variance of the considered one-dimensional profile 20, $\omega_x$ is the corresponding spatial frequency. This comparison step here implements a DIC algorithm which allows determining a displacement field UX and a luminance correction of the image which allow linking the one-dimensional profile 20 to its simplified model.

[Math. 1]

$$M_{1D}(x,y,z) = \mu + \sigma \cdot \sin(2\pi \cdot w_x \cdot x)$$

To obtain the field of displacement UX of the columns of weft yarns in the entire intermediate plane 16, it is then necessary to make a double passage on the filtered two-dimensional image 18 starting from the intermediate line 22 and up to the edges, by taking each time the result concerning the displacement field obtained at the preceding line to initialize the DIC algorithm. A first passage is carried out in the direction referenced 26, and a second passage is carried out in the direction referenced 28 (FIG. 10) to cover the entire filtered two-dimensional image.

The same operations can then be performed in steps E41, E42 and E43 for the other direction of the weaving, here the X direction. After passages on the entire filtered two-dimensional image in the X direction, the field of displacement UY of the columns of warp yarns throughout the intermediate plane 16 is obtained.

At the end of the iterations throughout the intermediate plane 16, the field of displacement UX and UY (and the image luminance corrections) of the warp and weft columns throughout the intermediate plane 16 is provided.

Finally, in step E50, all the images of the planes extracted from the filtered volume image 12 by the DIC algorithm are aligned with a simplified two-dimensional model and iterations from the intermediate plane 16. The equation of the model used as a simplified two-dimensional model is given below, where μ and σ are the average and the variance of the two-dimensional image extracted at the considered plane, $\omega_x$ and $\omega_y$ are the identified spatial frequencies.

[Math. 2]

$$M_{2D}(x,y,z) = \mu + \sigma \cdot [\sin(2\pi \cdot w_x \cdot x) + \sin(2\pi \cdot w_x \cdot y)]$$

The two-dimensional image 14 is first extracted at the level of the intermediate plane 16 for which the displacement fields UX and UY are provided. This two-dimensional image 14 is compared with its simplified model as defined above which is represented by a reference two-dimensional image 30 (FIG. 12). The DIC algorithm is initialized by using the displacement fields UX and UY found using the calculations performed in one dimension (steps E31 to E43). The two-dimensional image 14 can then be corrected to be aligned, and the aligned two-dimensional image 32 and the corresponding displacement fields are obtained.

It is now possible to proceed by iteration to achieve the alignment throughout the volume, by double iteration starting from the intermediate plane 16 and moving towards the edges in two opposite directions. A first iteration is carried out in the direction referenced 34, and a second iteration is carried out in the direction referenced 36 (FIG. 9) to cover the entire filtered volume image. At each iteration, the DIC algorithm is initialized with the results obtained at the previous plane.

Following step E50, displacement fields UX and UY are provided for all the planes. All the displacement fields UX and UY in the volume image allow accessing the transformation linking the deformed woven fibrous structure to its simplified (non-deformed) model, straightening its volume image 10 and characterizing the deformations undergone.

An example of a characterization system 40 for implementing a method according to one embodiment of the invention is represented schematically in FIG. 13. The system 40 comprises:

a first module 42 for processing the volume image to perform step E10, a module for obtaining a two-dimensional image 44 to perform step E20, a second module 46 for processing the two-dimensional image to perform step E31 and/or step E41, a module for obtaining a one-dimensional profile 48 to perform step E32 and/or step E42, a module 50 for comparing the one-dimensional profile with a reference profile to perform step E33 and/or step E43, and a module 52 for comparing two-dimensional image of different planes of the volume image to compare said two-dimensional images with a reference two-dimensional image, with a view to performing step E50.

The invention claimed is:

1. A method wherein, from a volume image, a fibrous structure having a three-dimensional weaving according to a given pattern between a plurality of warp yarns or strands extending along a first direction and a plurality of weft yarns or strands extending along a second direction perpendicular to the first one, the method comprising:
   a first processing of the volume image by filtering along a third direction perpendicular to the first and second directions so as to attenuate the periodic patterns along the third direction,
   obtaining a two-dimensional image representing warp yarns or strands and weft yarns or strands, said image corresponding to an intermediate plane along the third direction of the filtered volume image,
   a second processing of the two-dimensional image by filtering along the first or second direction so as to attenuate the periodic patterns along the first or second direction,
   obtaining a one-dimensional profile representing the positions of columns of warp or weft yarns or strands, said profile corresponding to an intermediate line along the first or second direction of the filtered two-dimensional image, and
   comparing the one-dimensional profile with a reference profile.

2. The method according to claim 1, further comprising the determination of a displacement field from the result of the comparison.

3. The method according to claim 1, wherein the comparison step is performed using the digital image correlation algorithm.

4. The method according to claim 1, wherein the filtering of the first and/or second processing is a Gaussian filtering where the width of the filter is determined as a function of an average spacing between yarn or strand layers along the considered filtering direction.

5. The method according to claim 1, further comprising a step of obtaining several one-dimensional profiles at consecutive lines of the filtered two-dimensional image, and a step of comparing iteratively from the intermediate line each obtained one-dimensional profile with the reference profile by taking into account the result of the comparison made at a previous line.

6. The method according to claim 5, further comprising, after having compared all the one-dimensional profiles in the first and second directions with the reference profile, a step of obtaining several two-dimensional images at consecutive planes of the filtered volume image, and a step of comparing iteratively from the intermediate plane each obtained two-dimensional image with a reference two-dimensional image by taking into account the result of the comparison made at a previous plane.

7. The method according to claim 1, wherein the volume image is obtained by X-ray tomography.

8. A system for characterizing, from a volume image, a fibrous structure having a three-dimensional weaving according to a given pattern between a plurality of warp yarns or strands extending along a first direction and a plurality of weft yarns or strands extending along a second direction perpendicular to the first one, the system comprising:
   a first module for processing the volume image by filtering along a third direction perpendicular to the first and second directions so as to attenuate the periodic patterns along the third direction,
   a module for obtaining a two-dimensional image representing warp yarns or strands and weft yarns or strands, said image corresponding to an intermediate plane along the third direction of the filtered volume image,
   a second module for processing the two-dimensional image by filtering along the first or second direction so as to attenuate the periodic patterns along the first or second direction,
   a module for obtaining a one-dimensional profile representing the positions of columns of weft or warp yarns or strands, said profile corresponding to an intermediate line along the first or second direction of the filtered two-dimensional image, and
   a module for comparing the one-dimensional profile with a reference profile.

9. A system comprising a computer having a processor and a memory storing a computer program including instructions for the execution of the steps of a method of claim 1, when said program is executed by the computer.

10. A non-transitory computer-readable recording medium on which a computer program is recorded comprising instructions for the execution of the steps of a method according to claim 1.

11. The method according to claim 2, wherein the comparison step is performed using the digital image correlation algorithm.

12. The method according to claim 2, wherein the filtering of the first and/or second processing is a Gaussian filtering where the width of the filter is determined as a function of an average spacing between yarn or strand layers along the considered filtering direction.

13. The method according to claim 3, wherein the filtering of the first and/or second processing is a Gaussian filtering where the width of the filter is determined as a function of an average spacing between yarn or strand layers along the considered filtering direction.

14. The method according to claim 2, further comprising a step of obtaining several one-dimensional profiles at consecutive lines of the filtered two-dimensional image, and a step of comparing iteratively from the intermediate line each obtained one-dimensional profile with the reference profile by taking into account the result of the comparison made at a previous line.

15. The method according to claim 3, further comprising a step of obtaining several one-dimensional profiles at consecutive lines of the filtered two-dimensional image, and a step of comparing iteratively from the intermediate line each obtained one-dimensional profile with the reference profile by taking into account the result of the comparison made at a previous line.

16. The method according to claim 4, further comprising a step of obtaining several one-dimensional profiles at consecutive lines of the filtered two-dimensional image, and a step of comparing iteratively from the intermediate line each obtained one-dimensional profile with the reference profile by taking into account the result of the comparison made at a previous line.

17. The method according to claim 2, wherein the volume image is obtained by X-ray tomography.

18. The method according to claim 3, wherein the volume image is obtained by X-ray tomography.

19. The method according to claim 4, wherein the volume image is obtained by X-ray tomography.

20. The method according to claim 5, wherein the volume image is obtained by X-ray tomography.

* * * * *